(12) United States Patent
Zarsuelo et al.

(10) Patent No.: US 10,444,983 B2
(45) Date of Patent: Oct. 15, 2019

(54) SIGNAL ANALYZING INSTRUMENT WITH TOUCH GESTURE CONTROL AND METHOD OF OPERATING THEREOF

(71) Applicant: Rohde & Schwarz GmbH & Co. KG, Munich (DE)

(72) Inventors: Laddie Zarsuelo, Singapore (SG); Roland Dingal, Singapore (SG)

(73) Assignee: Rohde & Schwarz GmbH & Co. KG, Munich (DE)

(*) Notice: Subject to any disclaimer, the term of this patent is extended or adjusted under 35 U.S.C. 154(b) by 135 days.

(21) Appl. No.: 15/270,574

(22) Filed: Sep. 20, 2016

(65) Prior Publication Data
US 2018/0081533 A1    Mar. 22, 2018

(51) Int. Cl.
*G06F 3/0488*    (2013.01)
*G06F 3/0484*    (2013.01)

(52) U.S. Cl.
CPC ...... *G06F 3/04883* (2013.01); *G06F 3/04845* (2013.01); *G06F 3/04847* (2013.01);
(Continued)

(58) Field of Classification Search
CPC ... G06F 3/041–3/047; G06F 3/0488–3/04886; G06F 2203/04104; G06F 2203/04808
See application file for complete search history.

(56) References Cited

U.S. PATENT DOCUMENTS 4,364,012 A * 12/1982 Auld ................. G01N 27/9053
324/237
6,064,372 A * 5/2000 Kahkoska ............ G06F 1/1601
345/173
(Continued)

FOREIGN PATENT DOCUMENTS

WO    WO-2014/166518 A1 * 10/2014

OTHER PUBLICATIONS

R&S ZVL Distance to Fault Measurements Application Sheet, Sep. 2008 [observed by Wayback Machine on Nov. 18, 2015] ("Application Sheet"). Retrieved on Mar. 25, 2018 from the Internet: <URL: https://cdn.rohde-schwarz.com/pws/dl_downloads/dl_common_library/dl_manuals/gb_1/z/zyl_1/Distance-to-Fault_Measurements.pdf>.*

*Primary Examiner* — Gene W Lee
(74) *Attorney, Agent, or Firm* — Schwabe, Williamson & Wyatt, P.C.

(57) ABSTRACT

An instrument is described which comprises an input for receiving a signal, a data processing unit for analyzing said received signal and providing data to be displayed, and a touch enabled display screen for displaying said data to be displayed and receiving commands directed to said data processing unit. Said commands comprise commands that determine how said data is displayed on the touch enabled display screen and commands that determine operations that are performed by said instrument and/or said data processing unit. Said commands are specified by control gestures on said touch enabled display screen. Said control gestures are unambiguously related to certain commands. Said data processing unit recognizes said control gestures wherein said data processing unit is configured to determine a corresponding command specified by said detected control gesture and to process said determined command. Said instrument is a test instrument for measuring and/or analyzing said received signal.

20 Claims, 6 Drawing Sheets

(52) U.S. Cl.
CPC ............ *G06F 2203/04806* (2013.01); *G06F 2203/04808* (2013.01)

(56) References Cited

U.S. PATENT DOCUMENTS

| | | | |
|---|---|---|---|
| 8,896,561 B1 | 11/2014 | Engel | |
| 8,907,910 B2 | 12/2014 | Stearns et al. | |
| 9,625,556 B1* | 4/2017 | Tsironis | G01R 35/00 |
| 2004/0189720 A1* | 9/2004 | Wilson | G06F 3/017 |
| | | | 715/863 |
| 2006/0125803 A1* | 6/2006 | Westerman | G06F 3/04883 |
| | | | 345/173 |
| 2009/0199130 A1* | 8/2009 | Tsern | G04G 21/08 |
| | | | 715/810 |
| 2009/0201263 A1* | 8/2009 | Hofmann | G06F 3/0488 |
| | | | 345/173 |
| 2013/0132856 A1* | 5/2013 | Binyamin | G06F 3/017 |
| | | | 715/740 |
| 2014/0189605 A1 | 7/2014 | Helfman | |
| 2014/0227981 A1* | 8/2014 | Pecen | H04B 1/0458 |
| | | | 455/77 |
| 2014/0240240 A1 | 8/2014 | Beck et al. | |
| 2014/0247232 A1* | 9/2014 | George-Svahn | G06F 3/02 |
| | | | 345/173 |
| 2014/0267024 A1* | 9/2014 | Keller | G06F 3/017 |
| | | | 345/156 |
| 2015/0128093 A1 | 5/2015 | McCarthy | |
| 2016/0070461 A1* | 3/2016 | Herbordt | G06F 3/04883 |
| | | | 345/178 |
| 2016/0188181 A1* | 6/2016 | Smith | G06F 3/048 |
| | | | 715/765 |

\* cited by examiner

SIGNAL ANALYZING INSTRUMENT WITH TOUCH GESTURE CONTROL AND METHOD OF OPERATING THEREOF

TECHNICAL FIELD

The invention relates to an instrument, in particular a measurement instrument, as well as a method of operating such an instrument.

BACKGROUND OF THE INVENTION

Test instruments are known in the prior art which typically receive a signal, for instance a radio frequency signal, to be analyzed and which comprise a display screen on which information about the received signal is displayed for the user of the test instrument. For obtaining data or information about the received signal, the test instruments further comprise a data processing unit which is inter alia used for processing and analyzing the received signals.

Usually, the data processing unit provides more data than can be displayed on one screen, in particular in a graphic displayed on the display screen. Accordingly, such measurement instruments have mechanisms allowing the user to adjust the information or data to be displayed on the display screen. These mechanisms are typically provided by buttons which have to be pressed by the user.

Particularly, hand-held test instruments for measuring and/or analyzing signals such as hand-held signal/spectrum analyzers, hand-held network analyzers, hand-held oscilloscopes or hand-held directional finding units use a lot of buttons as mechanisms to control which data is displayed on the display screen and how the data is displayed on the display screen.

However, such portable test instruments may be used under harsh conditions, for instance under adverse lighting conditions, which make it difficult to recognize which button has to be pressed for displaying the required information/data and/or for executing the desired operation which is related to a certain button.

Other (hand-held) test instruments use a graphical user interface displaying icons which have to be pressed for executing the desired command. However, depending on the design of the icons, the control is more or less intuitive.

Therefore, a lot of experience is required to find the correct button and/or to understand the meaning of each icon.

Therefore, currently available hand-held test instruments do not provide an intuitive control.

SUMMARY OF THE INVENTION

The invention provides an instrument comprising an input for receiving a signal, a data processing unit for analyzing said received signal and providing data to be displayed, and a touch enabled display screen for displaying said data to be displayed and receiving commands directed to said data processing unit. Said commands comprise commands that determine how said data is displayed on said touch enabled display screen and commands that determine operations that are performed by said instrument and/or said data processing unit. Said commands are specified by control gestures on said touch enabled display screen. Said control gestures are unambiguously related to certain commands. Said data processing unit recognizes said control gestures wherein said data processing unit is configured to determine a corresponding command specified by said detected control gesture and to process said determined command. Said instrument is a test instrument for measuring and/or analyzing said received signal wherein said data processing unit and said touch enabled display screen are configured to recognize a multi-touch control gesture performed by more than one finger.

The invention is based on the finding that a test instrument can be easily and intuitively controlled by control gestures which are unambiguously related to certain commands which are executed by the data processing unit. Hence, a certain control gesture relates to an intended command, for instance a certain way how data is displayed on the display screen, setting a certain parameter used by the data processing unit and/or operations that are performed by said instrument and said data processing unit respectively. The data processing unit is connected to the touch enabled display screen such that control gestures performed by the user on said touch enabled display screen are detected and recognized by the data processing unit. In addition, the data processing unit interprets the recognized control gesture into a certain command which is unambiguously related to the certain control gesture. Accordingly, the data processing unit will execute a certain command if the data processing unit detects and recognizes the corresponding control gesture. Therefore, the user of the test instrument can easily and intuitively control the test instrument as he must not be aware of pushing the correct buttons which may result in an incorrect operation. As said data processing unit and said touch enabled display screen are configured to recognize a multi-touch control gesture performed by more than one finger, it is ensured that multiple control gestures can be performed in order to control the test instrument.

Generally, the data processing unit is configured such that the data processing unit may notice which data/information is currently displayed on the touch enabled display screen. Accordingly, the command to be executed by the data processing unit which corresponds to the recognized control gesture may depend on the currently displayed data/information.

According to an aspect, a first control gesture is specified by tapping a finger twice or by tapping two fingers simultaneously on said touch enabled display screen wherein said first control gesture is related to a first command according to which a marker is created in a displayed Smith chart mode and said marker is displayed on said touch enabled display screen. Thus, the user can easily create a marker if a Smith chart is currently displayed on the display screen when the user performs said first control gesture. Hence, there is no need to position the marker by a cursor or several buttons which is more complicated. The marker can be easily created at the desired position by tapping on this position which facilitates the usage of the test instrument. For instance, signal/spectrum analyzers and network analyzers use Smith chart modes.

In general, a Smith chart is used for impedance matching of signals as the Smith chart is a graphical aid for engineers specialized in radiofrequency (RF) engineering. Typically, the Smith chart is a circular plot with a lot of interlaced circles. Using the Smith chart, matching impedances can be made without any computation. In the Smith chart, multiple parameters can be displayed simultaneously, for instance impedance admittances, reflection coefficients, scattering parameters, noise figure circles, constant gain contours and regions for unconditional stability. A marker provides the user with the relevant information about the position selected in the Smith chart, in particular regarding the parameters.

Further, said control gestures can comprise drag gestures having a certain drag direction and/or drag lengths while the at least one finger remains in contact with said touch enabled display screen. Thus, the data processing unit detects a continuous touching of the touch enabled display screen and interprets this touching as a certain drag gesture which is related to a specific command. In general, a drag gesture is defined by dragging at least one finger along a path which is characterized by its direction and its distance. Thus, the direction of motion of the finger(s) specifies information about the identity of the control gesture and its corresponding command.

According to another aspect said drag length is related to the intensity of said corresponding command. Therefore, the data processing unit senses the length of the drag gesture wherein the length may correspond to an intensity in a proportional manner. For instance, a long distance corresponds to a high intensity. Therefore, the motion of the finger may also impart information as to the intensity.

For instance, said drag gestures may comprise drag gestures performed by only one finger.

According to another aspect, said drag gestures may comprise drag gestures performed by at least two fingers.

Further, said drag gestures may comprise drag gestures performed by five fingers.

In general, the data processing unit is configured to recognize the number of fingers touching the touch enabled display screen simultaneously. Further, the data processing unit is configured to detect that the at least one finger moves along a certain way such that a specified drag gesture is recognized which relates to a certain command. Generally, the fingers can move along the same direction or they can move in different directions. The direction of motion of the fingers and/or the relative directions in which the fingers move specify a certain drag gesture. This certain drag gesture is recognized by the data processing unit and interpreted as a specified command unambiguously related to the control gesture.

According to an aspect, a second control gesture is specified by swiping two fingers to a first direction on said touch enabled display screen wherein said second control gesture is related to a second command according to which a stop distance in a distance-to-fault mode (DTF mode) is increased or decreased. Depending on the direction of the movements of both fingers during the swiping movement, the stop distance is increased or decreased. Thus, the user of the test instrument can easily increase or decrease the stop distance in the distance-to-fault mode by touching the touch enabled display screen and performing the second control gesture. It is not necessary that the user pushes any buttons in order to increase or decrease the stop distance in a distance-to-fault mode. As already mentioned, these specific commands may be related to the second control gesture, in particular both alternatives (left or right swiping), in the displayed distance-to-fault mode as the data processing unit detects that this certain mode is active and displayed respectively.

In general, a distance-to-fault mode is used for performance and failure analyses, in particular for antenna and transmission lines. The analyzer can locate faults and discontinuities on cables and transmission lines. In this mode, the user of the test instrument can adjust the stop distance to the desired amount which corresponds to the length of the cables used, for instance. The intended stop distance can be commanded by performing said second control gesture which is recognized and interpreted by the data processing unit.

According to another aspect, a third control gesture is specified by drawing a circle with two fingers on said touch enabled display screen wherein said third control gesture is related to a third command according to which a limit circle in a displayed Smith Chart mode is provided. Therefore, the limit circle can be created easily as its border is provided by the fingers touching the touch enabled display screen. The data processing unit detects that two fingers are moving along a circle line and translates this control gesture in the corresponding command to provide a limit circle in the Smith Chart. Thus, the user can easily create the circle to the intended size and position. In general, the limit circle, also called limiting circle, may correspond to a certain Voltage Standing Wave Ration (VSWR) value. By creating the limit circle, the data processing unit receives inter alia the command that the data is only shown within the limit circle drawn. Accordingly, the third control gesture being a control gesture is related to how data is displayed on the touch enabled display screen.

Furthermore, a fourth control gesture may be specified by pinching two fingers in a diagonal direction on said touch enabled display screen outwardly or inwardly wherein said fourth control gesture is related to a fourth command according to which the displayed data is zoomed out or zoomed in, in particular a displayed trace, screen or map. The zoom-out or zoom-in function of the test instrument is easily to adjust to the desired intensity as the length of the pinching movement corresponds to the zooming factor.

By doing so, the user can also easily determine the region displayed on the touch enabled display screen which should be zoomed in or zoomed out wherein the zoom level of the display screen is defined by the distance along which the fingers move in different directions while remaining in contact with the touch enabled display screen.

Further, a fifth control gesture is specified by pinching five fingers inwardly or outwardly wherein said fifth control gesture is related to a fifth command according to which backlight of said touch enabled display screen is dimmed or increased. Thus, it is ensured that the backlight, in particular its intensity, can be adjusted by a drag gesture easily and intuitively. The user of the test instrument does not press a button for adjusting the backlight. Therefore, a false command can be avoided when the user does not know by heart which button has to be pressed or when the user is less experienced in operating said test instrument. In operation, the display is illuminated such that the user can easily find the display and, therefore, the user can adjust the backlight to the lighting conditions by performing said drag gesture.

According to another aspect, a sixth control gesture is specified by flicking one finger on said touch enabled display screen wherein said sixth control gesture is related to a sixth command according to which an object displayed is deleted. The user can easily delete an object which displayed on the display screen by touching the object such that the object is selected and then performing a flicking movement without releasing the finger. The data processing unit recognizes the selecting progress and waits for a flicking movement of the finger in order to execute the corresponding command of deleting that object. This control gesture can be provided for any content displayed or just for certain content displayed, for instance markers displayed in a Smith Chart.

Said selected object may be a marker displayed on said touch enabled display screen, in particular in a Smith Chart mode. Thus, a previously created marker in a can be removed by that sixth control gesture.

In general, the second to sixth control gestures mentioned above are drag gestures which are inter alia defined by the motion of the at least one finger.

Accordingly, the marker may be created previously by a control gesture and it may also be deleted by a control gesture wherein the control gestures distinguish from each other as tapping with two fingers on said touch enabled display screen corresponds to creating the marker whereas flicking one finger on said touch enabled display screen corresponds to the command of deleting a marker.

According to an aspect, said touch enabled display screen is a resistive display screen. Therefore, the user can use the test instrument under harsh conditions which requires wearing gloves, for instance. Thus, special gloves are not required for controlling the touch enabled display screen.

Alternatively, said touch enabled display screen is a capacitive display screen, in particular a self-capacitive display screen. For instance, a projected capacitive touch display is used in order to recognize a multi-touch and/or drag gestures easily.

Furthermore, said instrument is a signal/spectrum analyzer, a network analyzer, an oscilloscope or a directional finding unit. These instruments are typically used as test instruments for measuring and/or analyzing signals. Moreover, the received signals provide more data and information as can be displayed on one screen. Therefore, mechanisms have to be provided to ensure that the user can adjust and/or set the data and information to be displayed individually. Due to the control gestures, the plus in information can be requested intuitively by the user such that the information requested is displayed.

Particularly, the test instrument is a hand-held test instrument. Thus, a mobile and/or portable test instrument is provided which can be easily transported. Thus, the test instrument can be used at different places without any effort. Alternatively, said test instrument is a test instrument typically used in a laboratory, in particular a stationary device.

According to another aspect, said instrument comprises a battery unit supplying the required power for operating said instrument. Therefore, the test instrument can be used without any power plug and apart from electricity, in particular an electricity grid. Particularly, the battery unit is provided in a hand-held test instrument.

Alternatively, the test instrument has a power plug. Thus, the test instrument may be a stationary device which is plugged in for power supply.

Generally, said data processing unit and said touch enabled display screen are configured to recognize at least one of the above mentioned control gestures, in particular one of the first to sixth control gestures.

An example instrument may comprise:
a) an input for receiving a signal;
b) a data processing unit for analyzing said received signal and providing data to be displayed;
c) a touch enabled display screen for displaying said data to be displayed and receiving commands directed to said data processing unit;
d) said commands comprising commands that determine how said data is displayed on said touch enabled display screen and commands that determine operations that are performed by said instrument and/or said data processing unit;
e) said commands being specified by control gestures on said touch enabled display screen;
f) said control gestures being unambiguously related to certain commands;
g) said data processing unit recognizing said control gestures wherein said data processing unit is configured to determine a corresponding command specified by said detected control gesture and to process said determined command;
h) said instrument being a test instrument for measuring and/or analyzing said received signal; and
i) said data processing unit and said touch enabled display screen are configured to recognize a multi-touch control gesture performed by more than one finger.

Further, the invention provides a method of operating an instrument, in particular an instrument as mentioned above, wherein said instrument comprises an input for receiving a signal, a data processing unit for analyzing said received signal and providing data to be displayed, and a touch enabled display screen for displaying said data to be displayed and receiving commands directed to said data processing unit wherein said data processing unit and said touch enabled display screen are configured to recognize a multi-touch control gesture performed by more than one finger and wherein at least one of the following control gestures is performed to control said instrument:
a) tapping a finger twice or tapping two fingers simultaneously on said touch enabled display screen wherein said control gesture is related to a command according to which a marker is created and displayed on said touch enabled display screen in a displayed Smith chart mode,
b) swiping two fingers to a first direction on said touch enabled display screen wherein said control gesture is related to a command according to which a stop distance in a distance-to-fault mode is increased or decreased,
c) drawing a circle with two fingers on said touch enabled display screen wherein said control gesture is related to a command according to which a limit circle in a displayed Smith chart mode is provided,
d) pinching two fingers in a diagonal direction on said touch enabled display screen outwardly or inwardly wherein said control gesture is related to a command according to which the displayed data is zoomed in or zoomed out, in particular a displayed trace, screen or map,
e) pinching five fingers inwardly or outwardly wherein said control gesture is related to a command according to which backlight of said touch enabled display screen is dimmed or increased, and/or
f) flicking one finger on said touch enabled display screen wherein said control gesture is related to a command according to which an object displayed is deleted, in particular a marker displayed in a Smith Chart on said touch enabled display screen.

Accordingly, a user can easily control such a test instrument in order to select which data is displayed and to control how the data is displayed on the touch enabled display screen.

DETAILED DESCRIPTION OF THE INVENTION

Figure 1:
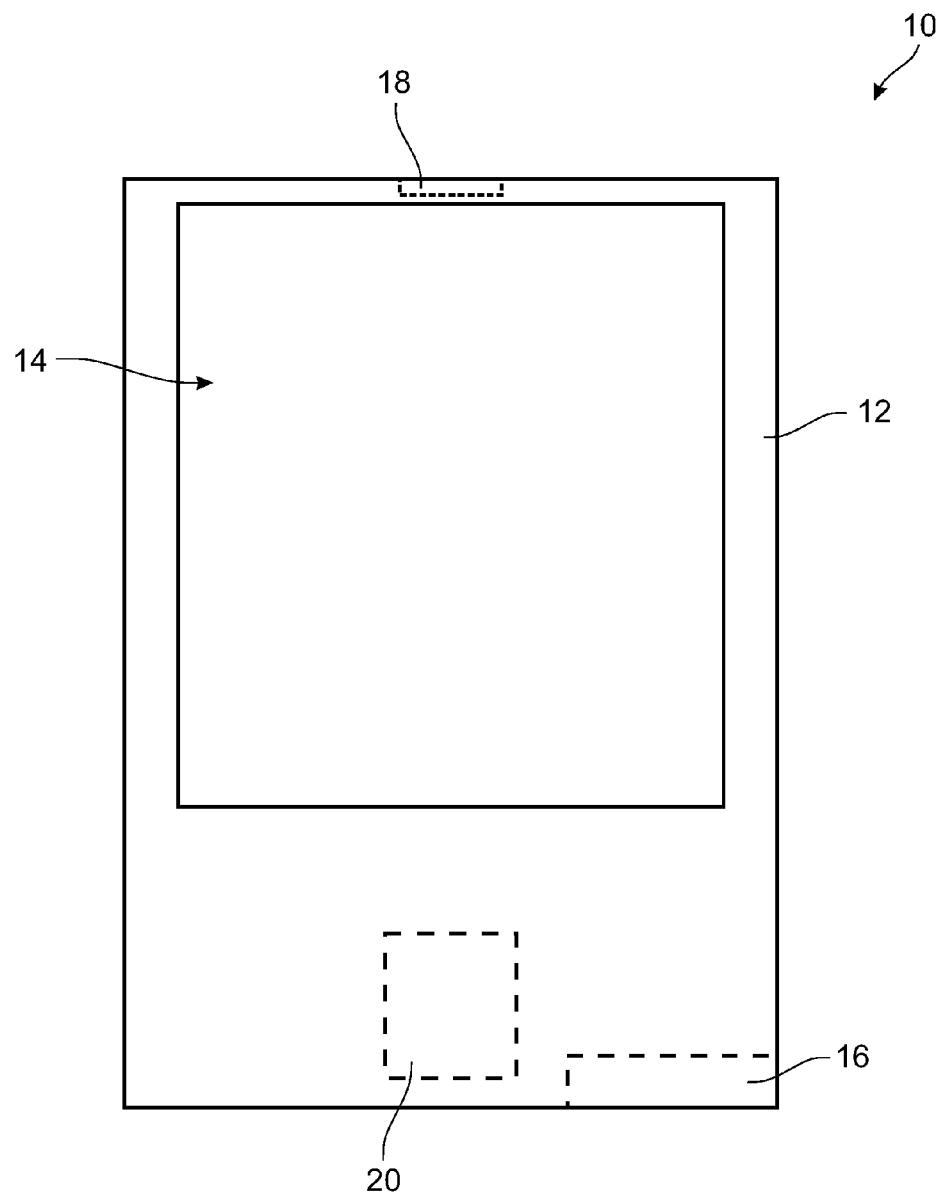
FIG. 1 schematically shows a hand-held test instrument according to the invention.
Figure 2:
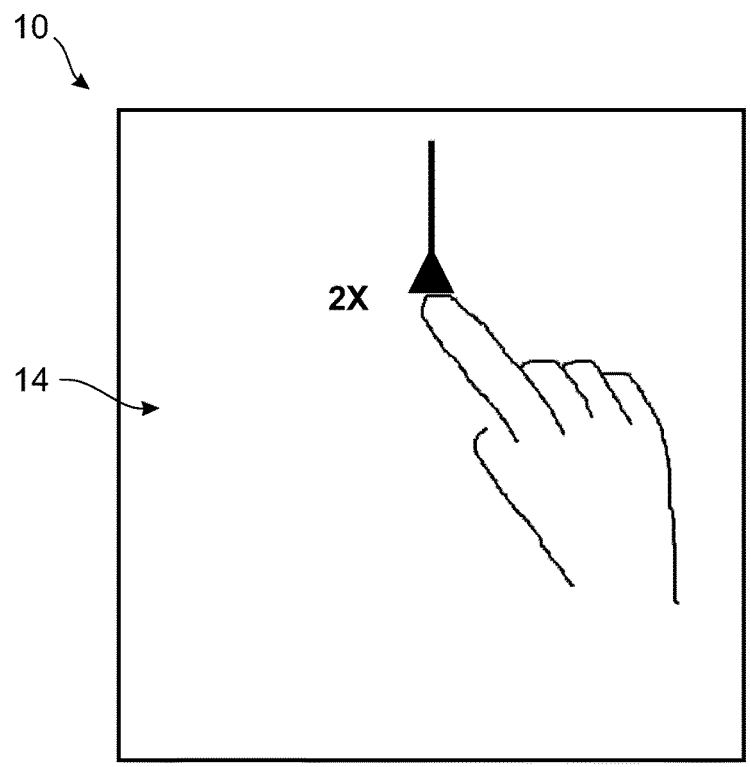
FIG. 2 shows a first control gesture for controlling the test instrument.

In FIG. 1, a hand-held and portable test instrument 10 is shown in a schematic manner wherein the test instrument 10 comprises a frame 12 and a display screen 14 which is substantially enclosed by the frame 12.

The display screen 14 is a touch enabled display screen which means that a user of the hand-held test instrument 10 can touch the display screen 14 in order to control the hand-held test instrument 10.

The display screen 14 may be a resistive one which reacts on a certain pressure applied to the display screen 14. Alternatively, the touch enabled display screen 14 is a capacitive display screen, in particular a self-capacitive display screen, for instance a projected capacitive touch display screen (PCT display screen). The PCT display screens easily recognize a multi-touch which means touching the display screen with at least two fingers simultaneously.

Particularly, the touch enabled display screen 14 is a force touch enabled display screen which additionally recognizes the force of the touching.

Furthermore, the hand-held test instrument 10 has a battery unit 16 which is used as power source in order to supply the hand-held test instrument 10 with the required power. Thus, the hand-held test instrument 10 can be used everywhere.

Alternatively, the test instrument 10 may be a device having a power plug ensuring the required operation voltage of the test instrument 10.

The test instrument 10 further comprises an input 18 for receiving a signal as well as a data processing unit 20 which is connected to the input 18 and the display screen 14. The input 18 may be an antenna, in particular an antenna array, an electrical port like a coaxial port or any other suitable port for receiving signals, in particular electromagnetic signals.

The data processing unit 20 is configured such that the data processing unit 20 analyzes the received signals, processes these signals such that information and data are provided regarding the received signals. Accordingly, the data processing unit 20 provides information and data to the display screen 14 such that the information and data can be displayed on the display screen 14. Thus, the user is informed about characteristics of the received signals, for instance.

However, the data processing unit 20 will gather more information and data than can be displayed on one screen. Therefore, mechanisms have to be provided that the user can select and/or command the data/information to be displayed and how the data/information is displayed on the display screen 14.

Accordingly, the data processing unit 20 comprises an internal storage unit in which several commands are stored which are unambiguously related to certain control gestures which can be performed on the touch enabled display screen 14 by touching the touch enabled display screen 14 in a certain way. The control gestures are typically performed by using at least one finger.

Thus, the touch enabled display screen 14 is used for displaying the data to be displayed which were received from the data processing unit 20. Furthermore, the touch enabled display screen 14 is also used for receiving commands which are directed to the data processing unit 20 in order to recalculate the information/data to be displayed as desired by the user. Accordingly, the touch enabled display screen 14 represents two interfaces, namely an input interface for commands from the user by the control gestures as well as an output interface for content displayed.

The control gestures which are shown in FIGS. 2 to 10 specify commands to be executed by the data processing unit 20 and the test instrument 10. These commands comprise commands that determine how data is to be displayed on the touch enabled display screen 14 and commands that determine operations that are performed by said test instrument 10 or said data processing unit 20.

For instance, a first control gesture is specified by tapping on the touch enabled display screen 14 with one finger twice. This control gesture is related to a specified command according to which a marker is created in a displayed Smith chart mode such that the created marker is displayed on said touch enabled display screen 14. Accordingly, the user can easily and intuitively choose the desired position for the marker as he has only to tap on the desired position. The user does not need to control a cursor or anything like that in order to set the marker to the desired position. Alternatively, the first control gesture may be specified by tapping two fingers once on the touch enabled display screen 14.

Figure 3:
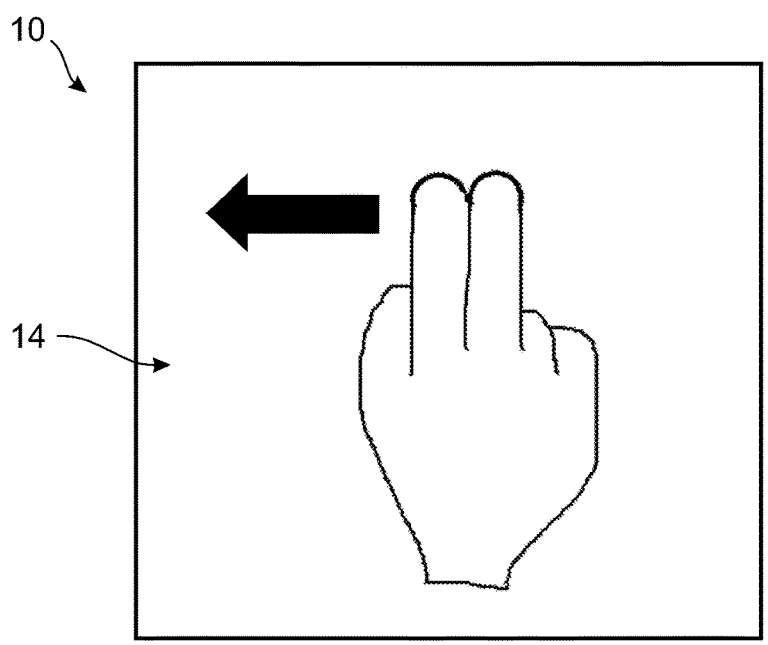
FIG. 3 shows a second control gesture in a first alternative for controlling the test instrument.
Figure 4:
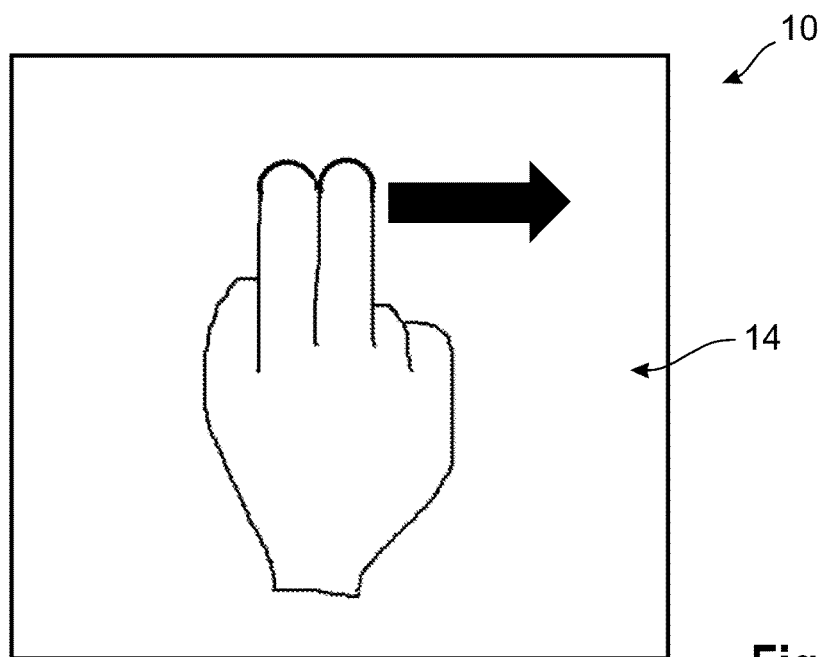
FIG. 4 shows a second control gesture in a second alternative for controlling the test instrument.

Further, the user can swipe with two fingers in a first or second direction as shown in FIGS. 3 and 4 in order to adjust a stop distance in a distance-to-fault mode of the test instrument 10, in particular to increase or decrease the stop distance. For instance, the first direction corresponds to a swiping movement to the left (FIG. 3) whereas the second direction corresponds to a swiping movement to the right (FIG. 4).

Figure 5:
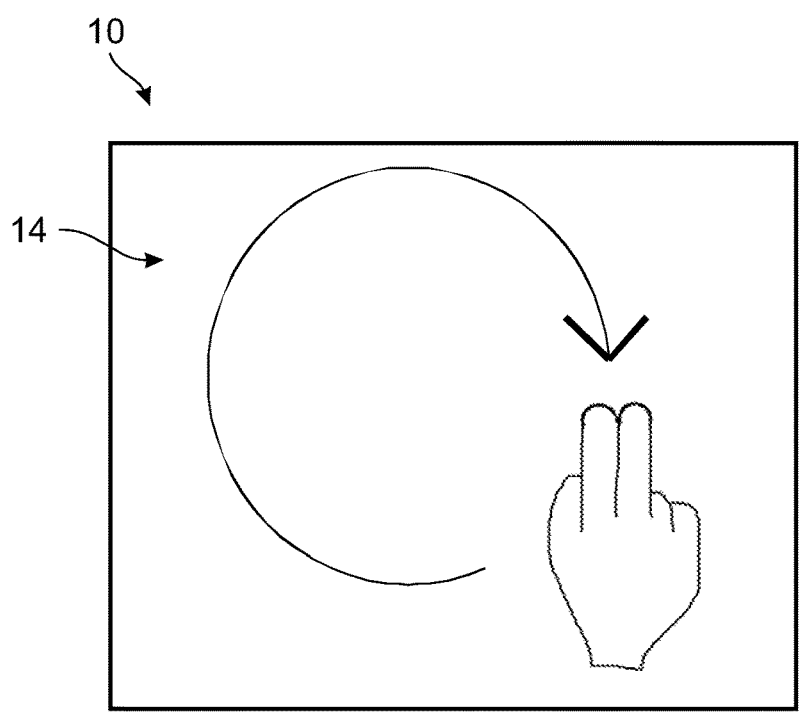
FIG. 5 shows a third control gesture for controlling the test instrument.

As shown in FIG. 5, the user can draw a circle with two fingers on said touch enabled display screen 14 wherein this certain control gesture is related to a command according to which a limit circle in a displayed Smith chart is provided. Therefore, the data processing unit 20 recognizes the special control gesture when a Smith chart mode is displayed on the touch enabled display screen 14 and it executes the operation related to the command which is specified by this control gesture.

Simultaneously, the data related to this operation is displayed on the display screen 14 such that the user gets a direct feedback that his intended command has been accepted and executed by the test instrument 10.

Figure 6:
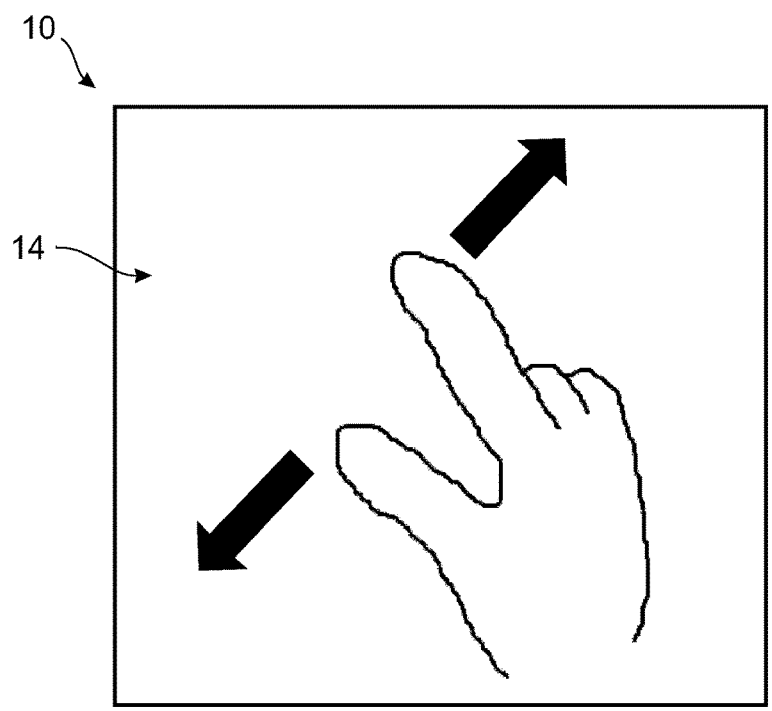
FIG. 6 shows a fourth control gesture in a first alternative for controlling the test instrument.
Figure 7:
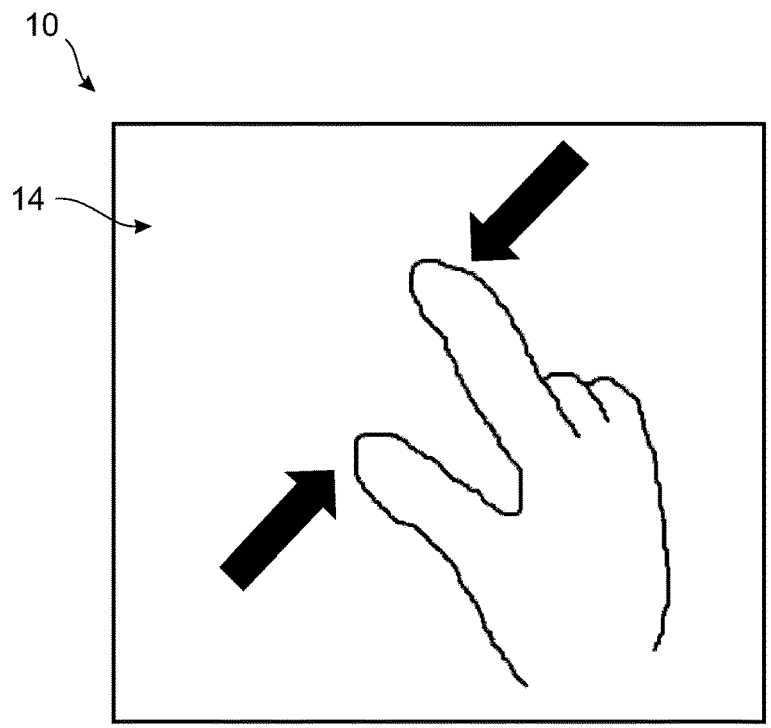
FIG. 7 shows a fourth control gesture in a second alternative for controlling the test instrument.

In FIGS. 6 and 7 a zoom in and a zoom out gesture are shown respectively wherein the user pinches two fingers in a diagonal direction on the touch enabled display screen 14 outwardly or inwardly. These control gestures are recognized by the data processing unit 20 such that the currently displayed data is zoomed out or zoomed in depending on the pinching direction.

The data processing unit 20 further recognizes the region of the display screen 14 which has been contacted by the user at the beginning of the pinching movement such that this region is zoomed in or out.

Further, the intensity of the zooming, e.g. the zoom factor, can be adjusted by the length of the pinching movement. A long distance corresponds to a high zoom factor.

Figure 8:
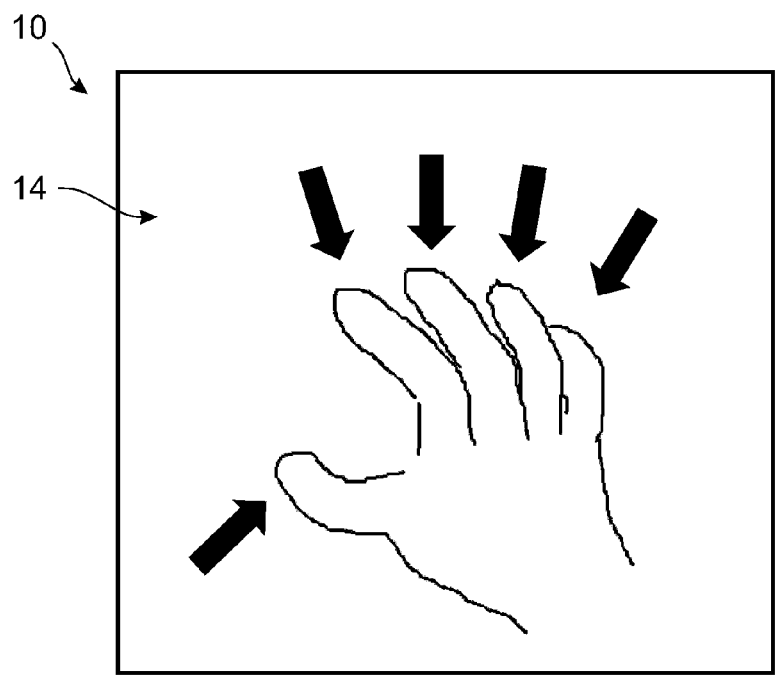
FIG. 8 shows a fifth control gesture in a first alternative for controlling the test instrument.
Figure 9:
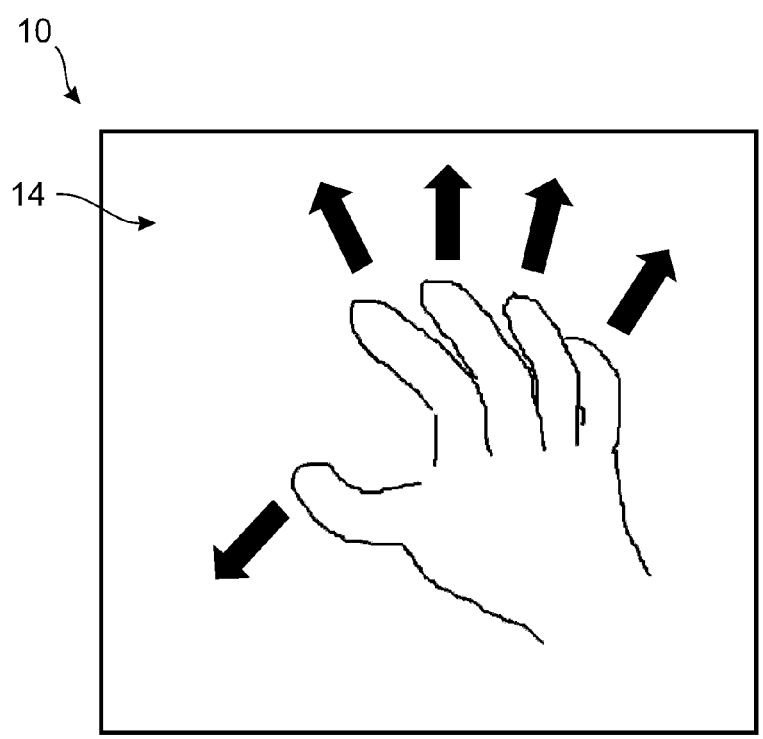
FIG. 9 shows a fifth control gesture in a second alternative for controlling the test instrument.

In FIGS. 8 and 9 another control gesture is shown wherein five fingers are pinched inwardly and outwardly respectively in order to dim or increase the backlight of the touch enabled display screen 14.

Such gesture is recognized by the data processing unit 20 independently of the displayed content as this is a higher-ranking or superior control gesture which command has to be executed always which means independently of the currently displayed content.

Figure 10:
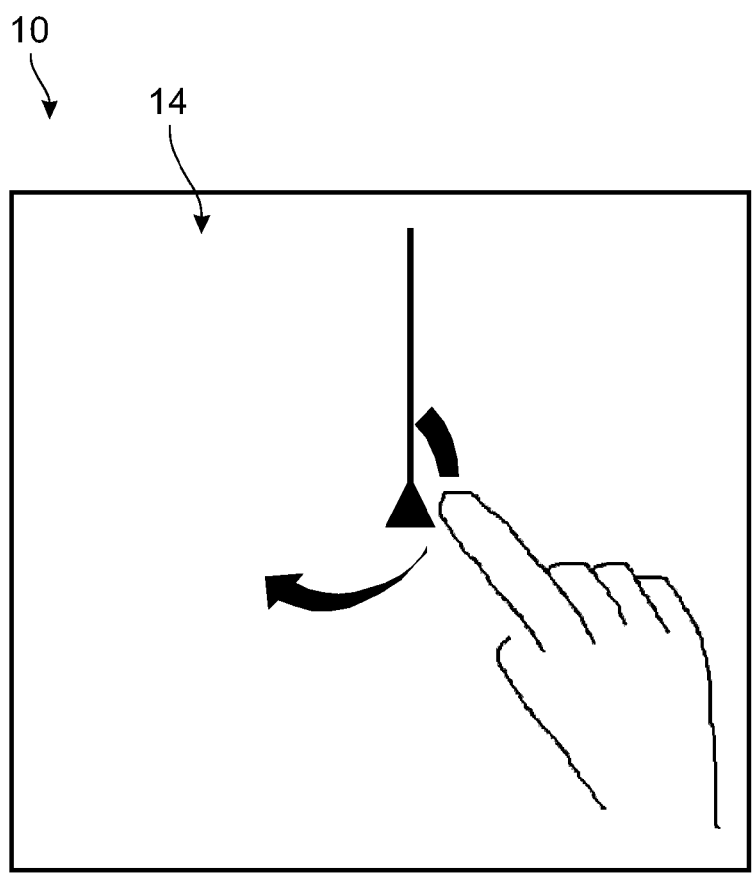
FIG. 10 shows a sixth control gesture for controlling the test instrument.

In FIG. 10 another control gesture is shown wherein the data processing unit 20 recognizes a flicking movement of one finger on said touch enabled display screen 14. The flicking gesture is specified by a certain movement characteristic while touching the touch enabled display screen 14.

The starting point of the flicking movement corresponds to a selecting process as it is usually done by tapping the touch enabled display screen 14 once at a certain position. Due to the following movement without releasing the display screen 14, the data processing unit 20 recognizes that a drag control gesture, in particular the flicking gesture, is performed which is unambiguously related to a certain command according to which the selected object displayed on the touch enabled display screen 14 shall be deleted.

In general, the control gestures are performed by the user of the test instrument 10 which is supplied by its own battery unit 16. The control gestures are performed on the display screen 14 wherein these gestures are related to specific commands in an unambiguously manner. The data processing unit 18 is connected to the display screen 14 such that the control gestures performed are recognized. The recognized control gesture is associated to the corresponding command in an unambiguously manner.

The commands may comprise commands that determine how said data is displayed on the display screen 14. Further, the commands may comprise commands that determine operations that are performed by the test instrument 10 and/or the data processing unit 18, for instance dimming backlight, creating an object, deleting an object and/or adjusting parameters such as a stop distance.

If the control gesture is associated to a certain command, this certain command will be executed by the data processing unit 20 such that the corresponding operation is performed and/or the related information/data is displayed on the touch enabled display screen 14 in the intended way (depending on the command associated to the control gesture).

Generally, the control gestures can comprise higher-ranking or superior control gestures which are always performed. Thus, these higher-ranking or superior control gestures are performed independently of the currently displayed content on the display screen 14, for instance dimming or increasing the backlight and/or any zooming commands. However, the control gestures may also comprise control gestures which corresponding commands are only executed when a certain mode is active while the control gesture is performed, for instance creating a marker, deleting a marker, adjusting a stop distance, creating a limit circle.

As already mentioned, the control gestures comprise drag gestures which are characterized by the direction of movement of the at least one finger as well as the length of movement without releasing the display screen 14. These drag gestures are inter alia shown in FIGS. 3 to 10.

In general, a test instrument 10 is provided which is easily and intuitively to control. Additionally, a method of operating a test instrument is also provided which simplifies controlling said test instrument.

The invention claimed is:

1. An instrument comprising:
an input for receiving a signal;
a data processing unit for analyzing said received signal and providing data to be displayed;
a touch enabled display screen for displaying said data to be displayed and receiving commands directed to said data processing unit;
said received commands comprising commands that determine how said data is displayed on said touch enabled display screen and commands that determine operations that are performed by said instrument and/or said data processing unit;
said received commands being specified by control gestures on said touch enabled display screen;
each of said control gestures being uniquely related to a specific one of certain commands;
said data processing unit recognizing said control gestures wherein said data processing unit is configured to determine a corresponding command specified by said detected control gesture and to process said determined command;
said control gestures comprising higher-ranking gestures whose corresponding commands are always performed independently of the currently displayed content and independently of instrument mode;
said control gestures comprising control gestures, other than the higher-ranking gestures, whose corresponding commands are only executed when a certain mode of the instrument is active;
said instrument being a test instrument for measuring and/or analyzing said received signal; and
said data processing unit and said touch enabled display screen are configured to recognize a multi-touch control gesture performed by more than one finger.

2. The instrument according to claim 1, wherein the control gestures include:
tapping a finger twice or tapping two fingers once on said touch enabled display screen wherein said control gesture is related to a command to display a marker on said display screen in a displayed Smith chart mode; and
drawing a circle with two fingers on said touch enabled display screen wherein said control gesture is related to a command to provide a limit circle in the displayed Smith chart mode.

3. The instrument according to claim 1, wherein said control gestures comprise drag gestures having a certain drag direction and/or drag length while the at least one finger remains in contact with said touch enabled display screen.

4. The instrument according to claim 3, wherein said drag length is related to the intensity of said corresponding command.

5. The instrument according to claim 3, wherein said drag gestures comprise drag gestures performed by only one finger.

6. The instrument according to claim 3, wherein said drag gestures comprise drag gestures performed by at least two fingers.

7. The instrument according to claim 3, wherein said drag gestures comprise drag gestures performed by five fingers.

8. The instrument according to claim 1, wherein a control gesture is specified by swiping two fingers to a first direction on said touch enabled display screen wherein said control gesture is related to a command according to which a stop distance in a distance-to-fault mode is increased or decreased.

9. The instrument according to claim 1, wherein a control gesture is specified by drawing a circle with two fingers on said touch enabled display screen wherein said control gesture is related to a command according to which a limit circle in a displayed Smith chart mode is provided.

10. The instrument according to claim 1, wherein a control gesture is specified by pinching two fingers in a diagonal direction on said touch enabled display screen outwardly or inwardly wherein said control gesture is related to a command according to which the displayed data is zoomed out or zoomed in, in particular a displayed trace, screen or map.

11. The instrument according to claim 1, wherein a control gesture is specified by pinching five fingers inwardly or outwardly wherein said control gesture is related to a command according to which backlight of said touch enabled display screen is dimmed or increased.

12. The instrument according to claim 1, wherein a control gesture is specified by flicking one finger on said touch enabled display screen wherein said control gesture is related to a command according to which an object displayed is deleted.

13. The instrument according to claim 12, wherein said selected object is a marker displayed on said touch enabled display screen.

14. The instrument according to claim 1, wherein said touch enabled display screen is a resistive display screen.

15. The instrument according to claim 1, wherein said touch enabled display screen is a capacitive display screen.

16. The instrument according to claim 1, wherein said instrument is a signal/spectrum analyzer, a network analyzer, an oscilloscope or a directional finding unit.

17. The instrument according to claim 1, wherein said instrument is a hand-held test instrument.

18. The instrument according to claim 1, wherein said instrument comprises a battery unit supplying the required power for operating said instrument.

19. A method of operating an instrument, wherein said instrument comprises an input for receiving a signal, a data processing unit for analyzing said received signal and providing data to be displayed, and a touch enabled display screen for displaying said data to be displayed and receiving commands directed to said data processing unit wherein said data processing unit and said touch enabled display screen are configured to recognize multi-touch control gestures performed by more than one finger, said control gestures each being unambiguously related to an associated specific prestored command, said control gestures comprising higher ranking control gestures whose corresponding commands are always performed independently of the currently displayed content and independently of instrument mode and control gestures, other than the higher ranking control gestures, whose corresponding commands are only executed when a certain mode of the instrument is active, and wherein at least one of the following control gestures is performed to control said instrument:

tapping a finger twice or tapping two fingers once on said touch enabled display screen wherein said control gesture is related to a command according to which a marker is created and displayed on said touch enabled display screen in a displayed Smith chart mode, swiping two fingers to a first direction on said touch enabled display screen wherein said control gesture is related to a command according to which a stop distance in a distance-to-fault mode is increased or decreased, drawing a circle with two fingers on said touch enabled display screen wherein said control gesture is related to a command according to which a limit circle in a displayed Smith chart mode is provided, pinching two fingers in a diagonal direction on said touch enabled display screen outwardly or inwardly wherein said control gesture is related to a command according to which the displayed data is zoomed out or zoomed in, in particular a displayed trace, screen or map, pinching five fingers inwardly or outwardly wherein said control gesture is related to a command according to which backlight of said touch enabled display screen is dimmed or increased, or flicking one finger on said touch enabled display screen wherein said control gesture is related to a command according to which an object displayed is deleted, in particular a marker displayed in a Smith chart on said touch enabled display screen.

20. A method of operating an instrument, wherein said instrument comprises an input for receiving a signal, a data processing unit for analyzing said received signal and providing data to be displayed, and a touch enabled display screen for displaying said data to be displayed and receiving commands directed to said data processing unit wherein said data processing unit and said touch enabled display screen are configured to recognize multi-touch control gestures performed by more than one finger, said control gestures each being associated with a specific prestored command, wherein said control gestures comprise higher-ranking gestures whose corresponding commands are always performed independently of the currently displayed content and independently of instrument mode and control gestures, other than the higher-ranking gestures, whose corresponding commands are only executed when a certain mode of the instrument is active, and wherein at least one of the following control gestures is performed to control said instrument:

tapping a finger twice or tapping two fingers once on said touch enabled display screen wherein said control gesture is related to a command according to which a marker is created and displayed on said touch enabled display screen in a displayed Smith chart mode;

swiping two fingers to a first direction on said touch enabled display screen wherein said control gesture is related to a command according to which a stop distance in a distance-to-fault mode is increased or decreased, drawing a circle with two fingers on said touch enabled display screen wherein said control gesture is related to a command according to which a limit circle in a displayed Smith chart mode is provided;

pinching five fingers inwardly or outwardly wherein said control gesture is related to a command according to which backlight of said touch enabled display screen is dimmed or increased; and/or flicking one finger on said touch enabled display screen wherein said control gesture is related to a command according to which an object displayed is deleted, in particular a marker displayed in a Smith chart on said touch enabled display screen.

* * * * *